(12) United States Patent
Haimovich et al.

(10) Patent No.: US 8,112,095 B2
(45) Date of Patent: Feb. 7, 2012

(54) SUM RATE OF BROADCAST CHANNELS WITH OUTDATED 1-BIT FEEDBACK

(75) Inventors: Alexander M. Haimovich, North Brunswick, NJ (US); Osvaldo Simeone, Hoboken, NJ (US); Bo Niu, Kearny, NJ (US); Oren S. Somekh, Princeton, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 954 days.

(21) Appl. No.: 12/111,152

(22) Filed: Apr. 28, 2008

(65) Prior Publication Data

US 2009/0005028 A1     Jan. 1, 2009

Related U.S. Application Data

(60) Provisional application No. 60/926,326, filed on Apr. 26, 2007.

(51) Int. Cl.
*H04W 72/00* (2009.01)
(52) U.S. Cl. .................. 455/453; 455/513; 455/329
(58) Field of Classification Search .......... 455/453, 455/513, 522, 446, 562, 340, 222, 249.1, 455/514, 520, 500, 456, 462, 452, 329; 370/437
See application file for complete search history.

(56) References Cited

U.S. PATENT DOCUMENTS

| 6,434,124 | B1 | 8/2002 | Rege |
| 2004/0008803 | A1 | 1/2004 | Aldrovandi et al. |

FOREIGN PATENT DOCUMENTS

WO   WO 2006/006770   1/2006

OTHER PUBLICATIONS

Bo Niu; Simeone, O.; Somekh, O.; Haimovich, A.M.; , "On the Sum-Rate of Broadcast Channels with Outdated 1-Bit Feedback," Signals, Systems and Computers, 2006. ACSSC '06. Fortieth Asilomar Conference on , vol., No., pp. 201-205, Oct. 29, 2006-Nov. 1, 2006.*
Diaz et al., "Scaling Law of the Sum-Rate for Multi-Antenna Broadcast Channels with Deterministic or Selective Binary Feedback," Information Theory Workshop, 2006 IEEE Punta Del Este, Uruguay, Mar. 13-17, 2006, Piscataway, NJ, IEEE, Jan. 1, 2006, pp. 298-301.
Diaz et al., "How Many Bits of Feedback is Multiuser Diversity Worth in MIMO Downlink?", 2006 IEEE Ninth International Symposium on Spread Spectrum Techniques and Applications, Aug. 1, 2006, pp. 505-509.

(Continued)

*Primary Examiner* — Christian Hannon (57) ABSTRACT

A single-input single-output (SISO) downlink channel with K users is analyzed in the presence of Rayleigh flat fading. A limited channel state information (CSI) feedback scheme is included, where only an outdated 1-bit feedback per user is available at the base station for each fading block. A closed-form expression for the achievable ergodic sum-rate of the 1-bit feedback scheme is presented for any number of users, as a function of the fading temporal correlation coefficient, the threshold of the 1-bit CSI quantizer and the SNR. The sum-rate scales with increasing number of users as log log K, which is the same scaling law achieved by the optimal non-delayed full CSI feedback scheme.

20 Claims, 3 Drawing Sheets

OTHER PUBLICATIONS

Seokhyun Yoon et al., "A Comparison of Opportunistic Transmission Schemes with Reduced Channel Information Feedback in OFDMA Downlink," IEEE International Symposium on Personal Indoor and Mobile Radio Communications (PIMRC'07), Sep. 1, 2007, pp. 1-5.

International Search Report and Written Opinion for PCT/IB2008/001671 mailed Feb. 2, 2009.

International Preliminary Report on Patentability for PCT/IB2008/001671, mailed Nov. 5, 2009.

Y. Rong, et al., "The Impact of Imperfect One Bit Per Subcarrier Channel State Information Feedback on Adaptive OFDM Wireless Communication Systems", *Proc. 60th IEEE Vehicular Technology Conference* (VTC'2004 Fall), Los Angeles, CA, USA, Sep. 26-29, 2004, vol. 1, pp. 626-630, 2004.

Y. Rong, et al., "On Average One Bit Per Subcarrier Channel State Information Feedback in OFDM Wireless Communication Systems", *IEEE Communications Society, Globecom* 2004.

S. Sanayei, et al., "Opportunistic Dynamic Subchannel Allocation in Multiuser OFDM Networks with Limited Feedback", *2004 IEEE Information Theory Workshop*, San Antonio, TX, Oct. 2004.

M. Johansson, "Diversity-Enhanced Equal Access—Considerable Throughput Gains With 1-bit Feedback", *Fifth IEEE Workshop on Signal Processing Advances in Wireless Communications*, Lisboa, Portugal, Jul. 2004.

D. Tse and P. Viswanath, *Fundamentals of Wireless Communications*, Cambridge University Press, 2005; http://www.eecs.berkeley.edu/~dtse/book.html.

S. Sanayei and A. Nosratinia, "Exploiting Multiuser Diversity with Only 1-Bit Feedback", *IEEE Communications Society*, WCNC 2005.

B. Niu, et al., "On the Sum-Rate of Broadcast Channels with Outdated 1-Bit Feedback", Inventors Disclosure Paper, disclosed Oct. 20, 2006, *Proc. 40th Asilomar Conf. Signals, Syst., Comput.*, Pacific Grove, CA, 2006.

O. Somekh, et al., "Sum-Rate Analysis of General OFDM Downlink Channels with 1-bit Feedback per Sub-Carrier", *Proceedings of the 40th Annual Conference on Information Sciences and Systems*, Princeton, NJ, Mar. 2006.

Diaz, et al., "Sum-Rate of MIMO Broadcast Channels with One Bit Feedback", *ISIT 2006*, Seattle, WA, Jul. 2006.

J. Diaz, et al., "Asymptotic Analysis of Reduced-Feedback Strategies for MIMO Gaussian Broadcast Channels", *Inventors Paper*, Oct. 2006.

Y. Rong, et al., "Adaptive OFDM Techniques With One-Bit-Per-Subcarrier Channel-State Feedback", *IEEE Transactions on Communications*, vol. 54, No. 11, pp. 1993-2003, Nov. 2006.

O. Somekh, et al., "Sum-Rate Analysis of Downlink Channels with 1-Bit Feedback", *IEEE Communications Letters*, vol. 11, No. 2, Feb. 2007.

Gesbert, D. and Alouini, S. "How much feedback is multi-user diversity really worth," Proc. IEEE Int. Conf. on Communications (ICC'04), Paris, France, Jun. 2004, pp. 234-238.

Hassel et al. "Rate Optimal Multiuser Scheduling with Reduced Feedback Load and Analysis of Delay Effects," EURASIP Journal on Wireless Communications and Networking, vol. 2006, pp. 1-7, 2006.

Jakes, W.C. "Microwave Mobile Communications," New York: Wiley, 1974, title page and table of contents, 5 pages.

Knopp, R. and Humblet, P. "Information capacity and power control in single cell multiuser communications," Proc. IEEE Int. Conf. on Communications (ICC'95), Seattle, WA. Jun. 1995, pp. 331-335.

Nuttall, A. H. "Some integrals involving the Q-function," Technical Report TR4297, Naval Underwater System Center, Newport RI, Apr. 17, 1972, 41 pages.

Simon, M. K. "Probability Distributions Involving Gaussian Random Variables: A Handbook for Engineers and Scientists," Kluwer Academic Press, 2002, title p. And table of contents, 8 pages.

Tse, D.N.C. "Optimal power allocation over parallel Gaussian channels," Proc. Int. Symp. Information Theory, Ulm, Germany, Jun. 1997, p. 27.

Verdu, S. "Spectral efficiency in the wideband regime," IEEE Transactions on Information Theory, vol. 48, pp. 1319-1343, Jun. 2002.

Viswanath et al. "Opportunistic Beamforming using Dumb Antennas," IEEE Transactions on Information Theory, vol. 48, pp. 1277-1294, Jun. 2002.

\* cited by examiner

SUM RATE OF BROADCAST CHANNELS WITH OUTDATED 1-BIT FEEDBACK

CROSS REFERENCE TO RELATED APPLICATIONS

The present application claims the benefit of U.S. Provisional Application Ser. No. 60/926,326, filed Apr. 26, 2007, entitled "Method and System for Sum-Rate of Broadcast Channels with Outdated 1-Bit Feedback," the contents of which are incorporated by reference herein.

BACKGROUND

This section is intended to provide a background or context. The description herein may include concepts that could be pursued, but are not necessarily ones that have been previously conceived or pursued. Therefore, unless otherwise indicated herein, what is described in this section is not prior art to the appended claims and is not admitted to be prior art by inclusion in this section.

In wireless communication systems, multiuser diversity capitalizes on independent fading channels across different users in order to enhance the throughput in the downlink/uplink of a cellular system. Serving the user with the best instantaneous channel quality has been shown to be optimal in terms of ergodic sum-rate for both the uplink and for the downlink. However, it requires all users to feed back their instantaneous channel state information (CSI) to the transmitter. It has been shown that, given this optimal scheduling, the ergodic sum-rate capacity of the downlink Rayleigh fading channel scales as log log K with the number of users K.

The optimal scheduling discussed above has at least two problems. First, there is a large amount of required feedback. Second, the feedback delay may cause the CSI fed back to the base station to be outdated. In order to reduce the feedback load, various schemes have been proposed. One approach prescribes feedback of a quantized version of the CSI. A 1-bit feedback scheme was proposed (without considering feedback delay). According to this scheme, for each fading block, users with channel power exceeding a given predetermined threshold feed back the bit "1", otherwise they indicate "0" to the base station. The base station randomly chooses one among the users with feedback bit "1" for data transmission with power P. When there is no user signaling a channel gain larger than the threshold, the transmitter keeps silent for one block period. This 1-bit feedback scheme suffers from a negligible loss of multiuser diversity gain as compared to the full CSI feedback scheme. In particular, the optimal scaling law of log log K is preserved.

In a realistic situation, it is impossible for the scheduler at the base station to access the instantaneous (and possibly quantized) CSI of each user. In fact, channel feedback information may become outdated if the fading channel is changing rapidly. This leads to a degradation of the system sum-rate. For instance, in case of full CSI feedback, the "best" user may no longer be the "best" after a feedback delay.

SUMMARY

Representative embodiments include achievable ergodic sum-rate of broadcast channels with outdated 1-bit feedback per user per fading block. Outdated is meant to refer to a delay that occurs between the time of the measurement of the channel at the user side and that of the scheduling at the base station. By exploiting a lower bound of the rate, with outdated 1-bit feedback per fading block for each user, the achievable sum rate demonstrates the same growth rate of log log K as a full CSI feedback scheme, with a carefully selected threshold.

A representative embodiment includes a single antenna base station that transmits to K single-antenna receivers in a broadcast channel. Users can be homogeneous and experience independent "block" Rayleigh flat fading. Accordingly, the fading processes are independent among different users, and the block duration is sufficiently small so as to guarantee that the fading gains remain constant during one block and change from block to block. A discrete time baseband representation of the channel is mathematically described as:

$$y_k(t) = h_k(t) \times (t) + n_k(t); \quad k=1, \ldots K \quad (1)$$

where $h_k(t) \sim CN(0, 1)$ is the channel fading coefficient of user k, $n_k(t) \sim CN(0, 1)$ is complex Gaussian noise with unit variance and assumed statistically independent among different users.

A representative method for using one-bit outdated feedback in wireless communication technology can include determining if a fading power is larger than a pre-determined threshold; if larger, communicating a single bit one via an uplink channel for a current fading block; and, if not larger, communicating a single bit zero via the uplink channel for the current fading block.

A representative system that uses one-bit outdated feedback in wireless communications can include a receiver and a processor. The receiver is configured to receive a communication from a base station via a broadcast channel. The processor has instructions to determine if a fading power of the received communication is larger than a pre-determined threshold and, if so, send a single bit one via an uplink channel for a current fading block.

A representative apparatus configured to receive communications via a single-input single-output downlink channel can include a single-antenna receiver that receives a signal from a base station via a downlink channel and a communication interface that sends the base station an outdated one-bit feedback via an uplink channel for a fading signal block when a fading power is greater than a threshold power.

Other principal features and advantages will become apparent to those skilled in the art upon review of the following drawings, the detailed description, and the appended claims.

BRIEF DESCRIPTION OF THE DRAWINGS

Representative embodiments are hereafter described with reference to the accompanying drawings.

DETAILED DESCRIPTION

Figure 1:
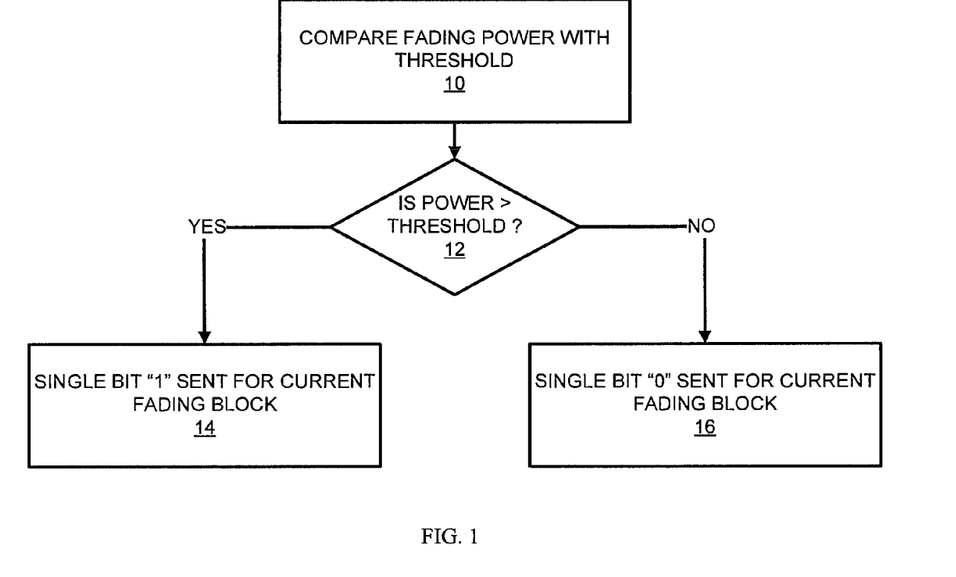
FIG. 1 illustrates operations performed by a network user in a method of using 1-bit outdated feedback in accordance with a representative embodiment.

FIG. 1 illustrates operations performed by a network user in a method of using 1-bit outdated feedback in wireless communication systems. Additional, fewer, or different operations may be performed depending on the implementation. For representative embodiments described herein, the assumption is made that each user is aware of its own fading power level $v_k^2(t)=|h_k(t)|^2$ based on a perfect channel estimation at time t. In an operation 10, the user compares its own fading power with a prescribed threshold $\alpha$. If the received power $v_k^2(t)$ is larger than the threshold $\alpha$, as determined in operation 12, the user feeds back a single bit of "1" through a reliable uplink channel for the current fading block in an operation 14. Otherwise, it feeds back a single bit of "0" for the current fading block in an operation 16.

Figure 2:
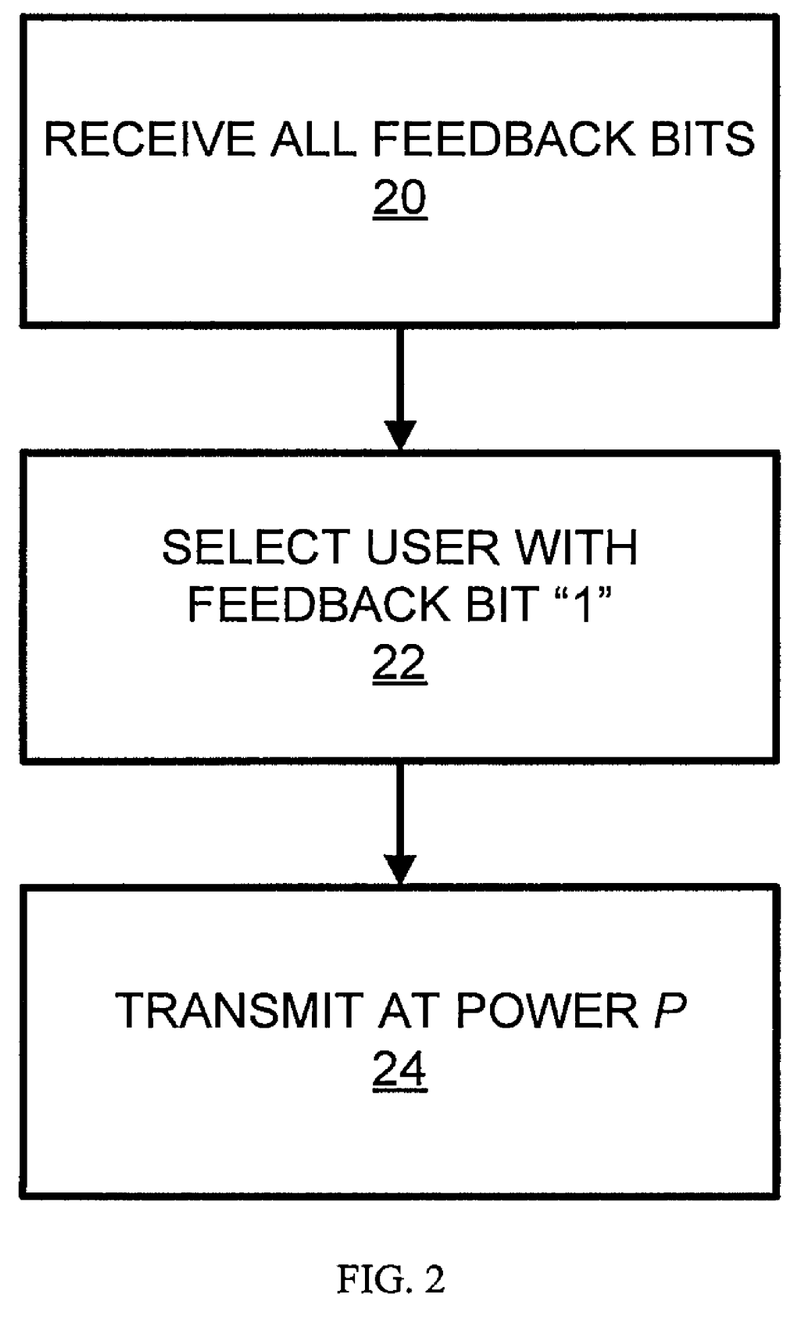
FIG. 2 illustrates operations performed by a network base station in a method of using 1-bit outdated feedback in accordance with a representative embodiment.

FIG. 2 illustrates operations performed by a network base station in a method of using 1-bit outdated feedback in wireless communication systems. Additional, fewer, or different operations may be performed depending on the implementation. At time t+τ, the base station receives all feedback bits (operation 20) and randomly chooses one of the users with feedback bit "1" (operation 22) for transmission with power P. In an operation 24, the base station transmits the selected user at power P. If no user has fed back a "1" bit, the base station keeps silent for the current block. With the above scheduling mechanism, the transmitted signal x is a zero mean complex Gaussian random variable with power $P(E[|x|^2])=P$, when at least one user has fading power level larger than the threshold $\alpha$; it reads x=0 when all the feedback bits are zeros.

During the delay τ between perfect channel estimation and scheduling decision, the state of the channel chosen for transmission is subject to change. The temporal channel correlation coefficient between the channels at time t and t+τ is ρ. As an example, the temporal channel correlation ρ can be related to the delay τ through Jake's model as $\rho=J_o(2\pi f_D|\tau|)$, where $J_0$ is the zero-order Bessel function of the first kind, and $f_D$ is the Doppler Spread. In representative embodiments, the transmitter has knowledge about τ, through, e.g., estimation of the Doppler spread.

The achievable ergodic sum-rate of the 1-bit feedback scheme described above in presence of feedback delay can be derived as follows. The achievable ergodic sum-rate of the 1-bit feedback scheme with power P, K users, temporal channel correlation coefficient τ, and arbitrary threshold $\alpha$, is given by $$R(\alpha, \rho, P) = (1-(1-e^{-\alpha})^K) \qquad (2)$$
$$\int_0^\infty \log(1+z^2P)2z \times e^{-z^2+\alpha}Q_1\left(\frac{\sqrt{2}\rho}{\sqrt{1-\rho^2}}z, \frac{\sqrt{2\alpha}}{\sqrt{1-\rho^2}}\right)dz,$$

where $$Q_1(a,b) = \int_b^\infty \exp\left(-\frac{x^2+a^2}{2}\right)I_0(ax)dx \text{ is the first-order Marcum-}Q \text{ function}$$

At any fading block, either one or no user is selected for transmission, and long codewords (spanning multiple fading blocks) are chosen from a Gaussian code book. The achievable ergodic sum-rate is the product of two terms: (i) the probability that at least one user is qualified to be chosen for transmission and (ii) the ergodic sum-rate for the chosen users over the fading blocks selected for transmission:

$$R(\alpha,\rho,P)=Pr(N>0)E[\log(1+v_T^2P)|v^2>\alpha], \qquad (3)$$

where the subscript k is dropped due to the statistical equivalence of different users and denoted v=v(t) and $v_\tau$=v(t+τ) (i.e., channel envelopes at the channel estimate and scheduling decision time instants, respectively).

The probability that at least one user is qualified to be chosen for transmission is:

$$Pr(N>0) = 1 - Pr(N=0) \qquad (4)$$
$$= 1 - (Pr(v^2 < \alpha))^K$$
$$= 1 - (1-e^{-\alpha})^K$$

where N is the number of users with channel power gain $v^2$ above the threshold $\alpha$.

In order to calculate the ergodic sum-rate for the chosen user over the fading blocks, the probability density function (pdf) of $v_\tau$ is needed given the condition $v^2 \geq \alpha$. From the cumulative distribution function (cdf) of $v_\tau$ given the condition $v^2 \geq \alpha$, $$F_{v_\tau}(z|v^2 \geq \alpha) = \frac{Pr(v_\tau < z, v \geq \sqrt{\alpha})}{Pr(v \geq \sqrt{\alpha})} \qquad (5)$$
$$= \frac{\int_0^z dv_\tau \int_0^\infty f(v_\tau, v)dv}{\int_{\sqrt{\alpha}}^\infty 2ve^{-v^2}dv},$$

where $$f(v_\tau, v) = \frac{4v_\tau v}{1-\rho^2}e^{-(v_\tau^2+v^2)/(1-\rho^2)}I_0\left(\frac{2\rho v_\tau v}{1-\rho^2}\right)$$

is the joint pdf of two correlated Rayleigh random variables. By taking the derivative of Equation (5) with respect to z, the conditional pdf is:

$$f_{v_\tau}(z|v^2 \geq \alpha) = \frac{\int_{\sqrt{\alpha}}^\infty \frac{4zv}{1-\rho^2}e^{-(z^2+v^2)/(1-\rho^2)}I_0\left(\frac{2\rho zv}{1-\rho^2}\right)dv}{e^{-\alpha}} \qquad (6)$$
$$= 2ze^{-z^2+\alpha}Q_1\left(\frac{\sqrt{2}\rho}{\sqrt{1-\rho^2}}z, \frac{\sqrt{2\alpha}}{\sqrt{1-\rho^2}}\right).$$

Substituting Equation (4) and Equation (6) into Equation (2) completes the proof.

To gain insight into the impact of delay on the achievable ergodic sum-rate of the 1-bit feedback scheme, it is convenient to derive upper and lower bounds on Equation (2). An upper bound of the rate is directly derived by using Jensen's inequality on Equation (2), $$R_{up}(\alpha,\rho,P)=(1-(1-e^{-\alpha})^K)\log(1+P)1+\rho^2\alpha)). \qquad (7)$$

On the other hand, a lower bound is obtained as follows:

$$R_{low}(\alpha, \rho, P) = (1-(1-e^{-\alpha})^K)\log(1+\alpha P) \qquad (8)$$
$$\left\{1+Q_1\left(\frac{\rho\sqrt{2\alpha}}{\sqrt{1-\rho^2}}, \frac{\sqrt{2\alpha}}{\sqrt{1-\rho^2}}\right) - Q_1\left(\frac{\sqrt{2\alpha}}{\sqrt{1-\rho^2}}, \frac{\rho\sqrt{2\alpha}}{\sqrt{1-\rho^2}}\right)\right\}.$$

Exploiting the lower bound Equation (8), the scaling law of the 1-bit feedback scheme with respect to the number of users K can be found as follows. For any finite power P and positive channel correlation coefficient $0<\rho\leq1$, with increasing number of users K, the 1-bit feedback scheme achieves the same growth rate as the full CSI feedback scheme:

$$\lim_{K\to\infty} \frac{R(\alpha_o(K), \rho, P)}{\log\log K} = 1, \quad (9)$$

where $\alpha_0(K)$ is the optimal threshold that maximizes $R(\alpha, \rho, P)$ for given K.

The lower bound Equation (8) suggests that, in order to get a multiuser diversity gain of $O(\log K)$ and to make the pre-log term close to 1, a "good" choice of the threshold is $\alpha_{SO}(K) = \log K - \delta$, where $\delta$ is a positive constant smaller than $\log K$. In fact, with this choice of threshold (referred to as sub-optimal threshold), it follows that:

$$\lim_{\substack{K\to\infty \\ \alpha=\alpha_{SO}(K)}} (1-(1-e^{-\alpha})^K) = e^{-e^\delta}, \quad (10)$$

and $$\lim_{\substack{K\to\infty \\ \alpha=\alpha_{SO}}} 1 + Q_1\left(\frac{\rho\sqrt{2\alpha}}{\sqrt{1-\rho^2}}, \frac{\sqrt{2\alpha}}{\sqrt{1-\rho^2}}\right) - Q_1\left(\frac{\sqrt{2\alpha}}{\sqrt{1-\rho^2}}, \frac{\rho\sqrt{\alpha}}{\sqrt{1-\rho^2}}\right) = 1. \quad (11)$$

From Equation (8), Equation (10) and Equation (11), it follows that $$\lim_{K\to\infty} \frac{R_{low}(\alpha_{so}(K), \rho, P)}{\log\log K} = 1 - e^{-e^\delta}. \quad (12)$$

Since $\delta$ can be chosen any arbitrary large number (after taking K to infinity), the ratio in Equation (12) goes to 1. Therefore, since a sub-optimal threshold preserves the scaling law of $\log\log K$, the 1-bit feedback scheme guarantees the same growth rate as the full CSI feedback scheme with an optimal threshold $\alpha_0(K)$, thus completing the proof.

Another interesting asymptotic result comes from the upper bound on the achievable ergodic sum-rate of the 1-bit feedback scheme in Equation (7). With large number of users K and optimal threshold $\alpha_0(K)$, it follows that $$\lim_{K\to\infty} R_{up}(\alpha_o(K), \rho, P) = \quad (13)$$

$$\lim_{K\to\infty} \left(1-(1-e^{-\alpha_{so}(K)})^K\right) \times \log(1+P(1+\rho^2\alpha_o(K))).$$

Since it has been shown above that there exists a suboptimal threshold $\alpha_0(K)$ such that $\lim_{K\to\infty}(1-(1-e^{-\alpha_\infty(K)})^K)=1$, it is apparent that the same condition holds with an optimal threshold $\alpha_0(K)$ Therefore, $$\lim_{K\to\infty} R_{up}(\alpha_o(K), \rho, P) \approx \log P\alpha_o(K) + 2\log\rho. \quad (14)$$

The approximation comes from the fact that in order to get a multiuser diversity of $\log\log K$, the optimal threshold $\alpha_0(K)$ is of $O(\log K)$, and $\log(1+x) \approx \log x$ for $x\gg 1$.

The first term in Equation (14), $\log P\alpha_0(K)$, is the optimized asymptotic rate with large number of users for the 1-bit feedback scheme without delay. Therefore, the second term 2 log $\rho$ provides a bound on the sum-rate degradation due to feedback delay in the asymptotic regime of large K. Below, it is shown via numerical results that this bound is in fact an accurate prediction of the real sum-rate degradation for $K\gg 1$.

The sum-rate of broadcast channels with outdated 1-bit feedback and operating in a power-limited (or wideband) regime is characterized by low SNR and low spectral efficiency. In order to characterize the spectral efficiency in the low SNR regime, two parameters are considered: (i) the minimum signal energy-per-information bit $$\frac{E_b}{N_{0\,min}}$$

required for reliable communication; (ii) the spectral efficiency slope $S_0$, also referred to as wideband slope, as a function $$\frac{E_b}{N_0} \text{ at } \frac{E_b}{N_{0\,min}}.$$

The notation R is introduced as to denote the sum-rate as a function of $$\frac{E_b}{N_0}.$$

This notion is related to the sum-rate of R as a function of the SNR P, through $$R\left(\frac{E_b}{N_0}\right) = R(P) \text{ and } P = R(P)\frac{E_b}{N_0}.$$

Thus, a linear approximation of the spectral efficiency versus $$\frac{E_b}{N_0}$$

in this regime is:

$$R\left(\alpha, \rho, \frac{E_b}{N_0}\right) \cong \frac{S_0}{3\text{ dB}}\left(\frac{E_b}{N_0}\bigg|_{dB} - \frac{E_b}{N_{0\,min}}\bigg|_{dB}\right). \quad (15)$$

The performance of the 1-bit feedback scheme in the wideband limit is shown by deriving closed-form expressions for both $$\frac{E_b}{N_{0\,min}}$$

and $S_0$. An asymptotic analysis of the two parameters with large number of users K and a sub-optimal threshold $\alpha_{SO}$ is also presented.

The minimum energy per bit required for reliable communication $$\frac{E_b}{N_0}_{min}$$

depends on the first order derivative of the sum-rate with respect to the SNR P, evaluated at P=0. Mathematically, this is showing using Equation (2) as:

$$\frac{E_b}{N_0}_{min} = \frac{\log 2}{\frac{\partial R(\alpha, \rho, P)}{\partial P}}\bigg|_{P=0} \quad (16)$$

$$= \frac{\log 2}{(1-(1-e^{-\alpha})^K)(1+\rho^2\alpha)}.$$

The spectral efficiency slope $S_0$ is a function of both the first order and the second order derivatives of the sum-rate:

$$S_0 = \frac{2\left(\frac{\partial R(\alpha, \rho, P)}{\partial P}\right)^2}{-\frac{\partial^2 R(\alpha, \rho, P)}{\partial P^2}}\bigg|_{P=0} \quad (17)$$

$$= \frac{(1-(1-e^{-\alpha})^K)(1+\rho^2\alpha)^2}{1+2\alpha\rho^2-\alpha\rho^4+\frac{1}{2}\alpha^2\rho^4}.$$

Using the results in Equation (16) and Equation (17), the sum-rate degradation due to the feedback delay in the asymptotic regime of low SNR is quantified for any number of users by means of Equation (15).

To further analyze the above results of Equation (16) and Equation (17), the asymptotic scenario with large number of users K and a sub-optimal threshold $\alpha_{SO}(K)=\log K-\delta$ (this sub-optimal threshold guarantees the asymptotic optimality of the scaling law) is considered. From Equation (16) and Equation (17), for $\rho>0$ and $K\gg 1$, $$\frac{E_b}{N_0}_{min} \rightarrow \frac{\log 2}{\rho^2 \log K}, \quad (18)$$

and $$S_0 \rightarrow 2. \quad (19)$$

Substituting these results in Equation (15), a linear approximation of the sum-rate versus $$\frac{E_b}{N_0}$$

in the wideband regime with large number of users is:

$$R\left(\alpha, \rho, \frac{E_b}{N_0}\right) \cong \frac{2}{3 \text{ dB}}\left(\frac{E_b}{N_0}\bigg|_{dB} - 10\log_{10}\frac{\log 2}{\rho^2 \log K}\right). \quad (20)$$

It is known that $$\frac{E_b}{N_0}_{min}$$

for reliable communication over a fading channel with no CSI at the transmit side is log 2=−1.59 dB. With 1-bit CSI feedback, a large number of users K and a temporal channel correlation coefficient ρ>0, the denominator in Equation (18) shows a multiuser diversity gain of $\rho^2$ log K. With increasing ρ, this leads to a decreasing required $$\frac{E_b}{N_0}_{min}$$

for reliable communication. Regarding the spectral efficiency slope $S_0$, it can be obtained from Equation (17) that it equals 1 when the temporal channel correlation coefficient is ρ=0. This result coincides with the case of perfect receiver side information but with no CSI at the transmitter. When ρ>0, the asymptotic spectral efficiency slope (19) equals 2 as for an AWGN channel.

Figure 3:
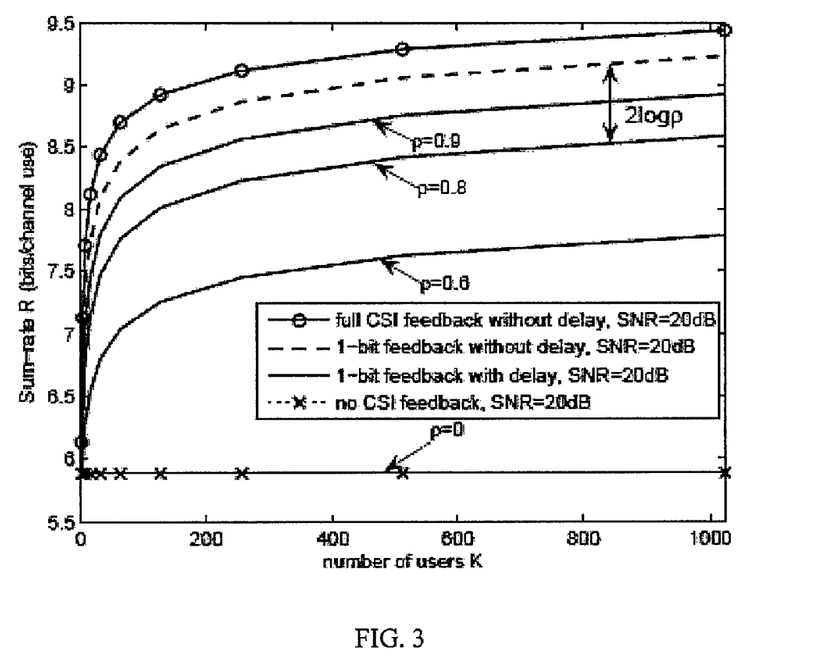
FIG. 3 is a graph depicting sum-rate R verses the number of users K for a 1-bit feedback scheme in accordance with a representative embodiment.

FIG. 3 shows an achievable ergodic sum-rate of the 1-bit feedback scheme versus the number of users K for different values of the channel temporal correlation coefficient ρ, with optimal threshold $\alpha_0(K)$ and SNR P=20 dB. The ergodic sum-rate with non-delayed full CSI, no CSI, and 1-bit feedback without delay, are also shown for reference. It can be seen that the 1-bit feedback scheme shows the same scaling law of the sum-rate with large number of users, for different channel correlation coefficients, but suffers a rate degradation that is well quantified by 2 log ρ as derived above.

Figure 4:
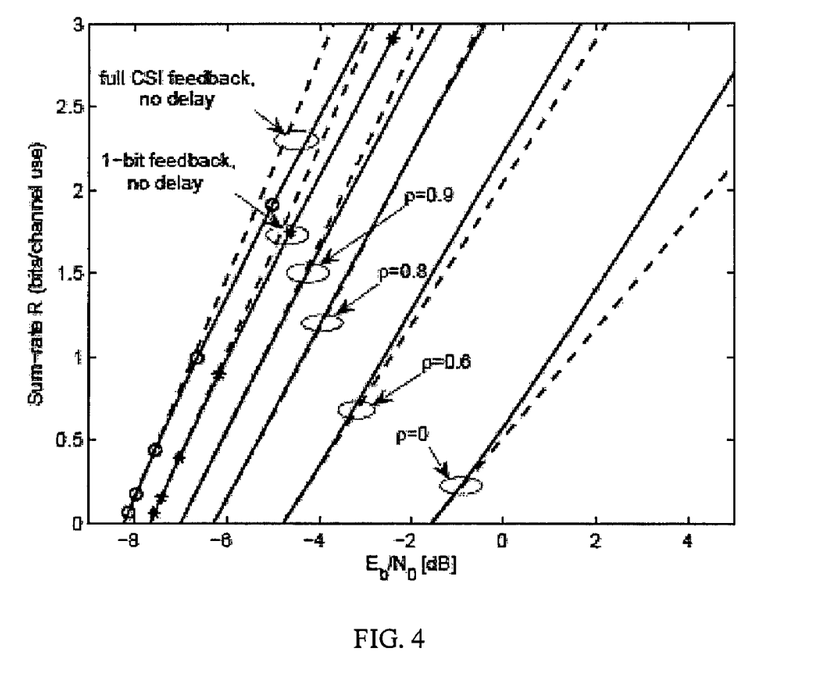
FIG. 4 is a graph depicting sum-rate of the 1-bit feedback scheme in low SNR regime and wideband approximation for different channel temporal correlations in accordance with a representative embodiment.

FIG. 4 shows the sum-rate of the 1-bit feedback scheme as a function of $$\frac{E_b}{N_0}$$

and its wideband approximation in Equation (15) according to Equations (16) and (17), for different channel temporal correlation coefficients ρ, with optimal threshold $\alpha_0(K)$ and finite number of users K=100. Spectral efficiencies and their linear approximations with non-delayed full CSI, no CSI, and 1-bit feedback without delay at low SNR regime, are also shown for reference. It is seen that there is a multiuser diversity gain in terms of $$\frac{E_b}{N_0}_{min}$$

between the 1-bit feedback scheme with different temporal channel correlation coefficients and the no CSI feedback scheme. This can be quantified as $10\log_{10}(\rho^2 \log K)$dB when the number of users K is large. The spectral efficiency slope increases from 1, which corresponds to the no CSI feedback case, to $S_0=2$, which equals to the spectral efficiency slope of a Gaussian channel.

The representative embodiments include the sum-rate of a SISO broadcast channel with 1-bit feedback in presence of feedback delays. A closed-form expression of the achievable ergodic sum-rate, which holds for any number of users, temporal channel correlation coefficient and threshold, has been shown, along with simple upper and lower bounds. Not only reducing the CSI feedback to 1 bit, but also considering the feedback delay, does not affect the scaling law of the sumrate. Furthermore, the feedback delay yields a sum-rate degradation which has been quantified for both cases of large number of users and low SNR.

One or more flow diagrams have been used to describe exemplary embodiments. The use of flow diagrams is not meant to be limiting with respect to the order of operations performed. The foregoing description of representative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for using one-bit outdated feedback in wireless communication technology, the method comprising:
   determining if a fading power is larger than a pre-determined threshold;
   if larger, communicating a single bit one via an uplink channel for a current fading block; and
   if not larger, communicating a single bit zero via the uplink channel for the current fading block.

2. The method of claim 1, wherein the fading power is a Rayleigh flat fading power independent to an individual single antenna.

3. The method of claim 1, wherein communicating the single bit one is from a first antenna to a base station.

4. The method of claim 3, wherein the base station comprises a single antenna.

5. The method of claim 3, further comprising receiving a communication via a broadcast channel from the base station.

6. The method of claim 5, further comprising determining the fading power from the received communication.

7. A system that uses one-bit outdated feedback in wireless communications, the system comprising:
   a receiver configured to receive a communication from a base station via a broadcast channel; and
   a processor having instructions to determine if a fading power of the received communication is larger than a pre-determined threshold and, if so, send a single bit one via an uplink channel for a current fading block.

8. The system of claim 7, wherein the processor includes instructions to send a single bit zero via the uplink channel.

9. The system of claim 7, wherein the receiver comprises a single antenna.

10. The system of claim 7, further comprising a base station configured to communicate with a plurality of devices via a broadcast channel.

11. The system of claim 10, wherein the base station is configured to select one of the plurality of devices that sent a feedback bit of one.

12. The system of claim 11, wherein the base station transmits communications from the selected one of the plurality of devices.

13. The system of claim 12, wherein the transmitted signal is a zero mean complex Gaussian random variable.

14. The system of claim 11, wherein the selection of one of the plurality of devices that sent the feedback bit of one is a random selection.

15. The system of claim 11, wherein the base station is configured to not communicate communications from the plurality of devices when no feedback bit of one is received for the current fading block.

16. The system of claim 11, wherein a sum-rate scales for increasing number, K, of plurality of devices as log log K.

17. An apparatus configured to receive communications via a single-input single-output downlink channel, the apparatus comprising:
   a single-antenna receiver that receives a signal from a base station via a downlink channel; and
   a communication interface that sends the base station an outdated one-bit feedback via an uplink channel for a fading signal block when a fading power is greater than a threshold power.

18. The apparatus of claim 17, wherein the fading signal block is statistically independent of fading signals of other devices communicating with the base station.

19. The apparatus of claim 17, wherein the communication interface sends the base station a single bit zero for the fading signal block when the fading power is less than the threshold power.

20. The apparatus of claim 17, further comprising a processor having instructions to compare the fading power and the threshold power.

* * * * *

UNITED STATES PATENT AND TRADEMARK OFFICE
CERTIFICATE OF CORRECTION

PATENT NO. : 8,112,095 B2
APPLICATION NO. : 12/111152
DATED : February 7, 2012
INVENTOR(S) : Haimovich et al.

It is certified that error appears in the above-identified patent and that said Letters Patent is hereby corrected as shown below:

Title page, item (56), under "Other Publications", in Column 2, Line 4, delete "Conference on , vol., No.," and insert -- Conference, --.

Page 2, item (56), under "Other Publications", in Column 1, Lines 7-8, delete "PCT/1B2008/001671," and insert -- PCT/IB2008/001671, --.

Page 2, item (56), under "Other Publications", in Column 2, Line 28, delete "title p. And" and insert -- title page and --.

Signed and Sealed this
Twenty-eighth Day of August, 2012

David J. Kappos
*Director of the United States Patent and Trademark Office*